United States Patent [19]
Feret et al.

[11] Patent Number: 5,902,846
[45] Date of Patent: May 11, 1999

[54] HIGH-PERFORMANCE OVERPRINT VARNISHES COMPRISING COMPOSITE SMA LATICES

[75] Inventors: Bruno Feret, Levallois; Isabelle Betremieux, Beaumontel, both of France

[73] Assignee: Elf Atochem S.A., Puteaux, France

[21] Appl. No.: 08/925,275

[22] Filed: Sep. 8, 1997

[51] Int. Cl.⁶ ..................................................... C08L 91/06
[52] U.S. Cl. ............................................ 524/276; 524/460
[58] Field of Search ...................................... 524/276, 460

[56] References Cited

U.S. PATENT DOCUMENTS

| | | | |
|---|---|---|---|
| 4,861,818 | 8/1989 | Timmerman | 524/460 |
| 5,373,045 | 12/1994 | Smith | 524/385 |
| 5,646,210 | 7/1997 | Timmerman | 524/460 |

FOREIGN PATENT DOCUMENTS

| | | |
|---|---|---|
| 0194687 | 9/1986 | European Pat. Off. . |
| 0675177 | 10/1995 | European Pat. Off. . |

*Primary Examiner*—Paul R. Michl
*Attorney, Agent, or Firm*—Burns, Doane, Swecker & Mathis, L.L.P.

[57] ABSTRACT

High-performance overprint varnishes, well-suited for the protective coating of a wide variety of substrates, e.g., papers, cardboards and packaging materials, include a composite latex and characteristically a polyethylene wax emulsion, the composite latex comprising the copolymerizate of at least one hydrophobic monomer within an aqueous solution of a styrene/maleic anhydride resin, the styrene/maleic anhydride resin having a molecular weight ranging from 500 to 5,000 and an acid number of at most 500, and the amount by weight of the styrene/maleic anhydride resin in the copolymerizate ranging from 5% to 50%.

23 Claims, No Drawings

HIGH-PERFORMANCE OVERPRINT VARNISHES COMPRISING COMPOSITE SMA LATICES

BACKGROUND OF THE INVENTION

1. Technical Field of the Invention

The present invention relates to novel overprint varnishes, and, more especially, to high-performance overprint varnishes comprising composite latices prepared by polymerizing at least one hydrophobic monomer within a matrix solution/dispersion of a particular styrene/maleic anhydride (SMA) resin.

By "overprint varnishes" are intended surface-improvement protective compositions designed to impart to treated surfaces, for example printed or unprinted papers and cardboards, enhanced resistance to external agents and influences, and, in particular, enhanced resistance to friction, moisture, and temperature, and even an improved appearance, for example improved glossiness.

2. Description of the Prior Art

Conventional overprint varnishes comprise aqueous compositions based on composite latices of the styrene/acrylate polymer-styrene/maleic anhydride resin type.

Thus, EP-A-675,177 (Goodrich) describes shell/core latices prepared via the polymerization of mixtures of hydrophobic monomers, such as butyl methacrylate, 2-ethylhexyl acrylate, and styrene in an aqueous styrene/maleic anhydride resin solution, this resin being rendered soluble by salification with a volatile nitrogenous base such as ammonia.

SUMMARY OF THE INVENTION

It has now unexpectedly and surprisingly been determined that especially high-performance overprint varnishes could be formulated from related composite latices exhibiting the following properties/characteristics:

(a) the styrene/maleic anhydride resin has a low molecular weight ranging from 500 to 5,000 and an acid number of at most 500;

(b) the amount by weight of this styrene/maleic anhydride resin in the resin/hydrophobic monomer copolymer mixture ranges from 5% to 50%; and (c) the glass transition temperature of the hydrophobic monomer copolymers is less than 30° C.

DETAILED DESCRIPTION OF BEST MODE AND SPECIFIC/PREFERRED EMBODIMENTS OF THE INVENTION

More particularly according to the present invention, the subject composite latices are prepared via conventional technique which entails providing a styrene/maleic anhydride resin solution by hot or warm dissolution of the resin in water, in the presence of ammonia or of a volatile nitrogenous base, then in dispersing therein the mixture of hydrophobic monomers, the free-radical polymerization of which is next carried out conventionally in the presence of water-soluble initiators, such as ammonium, potassium, or sodium persulfate, or in the presence of hydrogen peroxide and oxidation/reduction catalysts. The polymerization temperature advantageously ranges from 40° to 90° C., and preferably from 65° to 85° C. The solids concentration advantageously ranges from 20% to 60%. The polymerization may be carried out per a process utilizing a sealed reaction vessel, or semi-continuously. In the first event, the monomer and the initiator are added in their totality to the oligomer solution at the beginning of polymerization, and the temperature of the reaction medium is maintained constant and stirring continues for a period of from 2 to 4 hours In the second event, two dosing pumps permit the continuous addition, first, of the monomer mixture and, second, of the initiator solution to the polymer solution maintained at constant temperature while stirring continuously. The monomers and the initiator are added over a time period of from 30 minutes to 4 hours, depending on the quantity and nature of the monomers to be added. At the end of the pouring operations, the reaction medium is maintained at constant temperature and stirred continuously for a period of time of up to 4 hours.

The styrene/maleic anhydride resin may advantageously be partially esterified with a linear or branched hydrocarbyl alcohol having a hydrocarbon-containing chain incorporating from one carbon (methanol) to 18 carbon atoms, or with mixtures of such alcohols.

The hydrophobic monomers are polymerized because of the presence of sites of ethylenic or acrylic unsaturation within their molecular structure. Particularly exemplary such monomers according to the invention include styrene and derivatives thereof and (meth)acrylic esters. These monomers may be used either alone or in admixture to prepare a copolymer having the desired glass transition temperature. Adjustment of the glass transition temperature is a technique well known to this art. The qualification "hydrophobic" applies, as is conventional for these formulations, not to one particular comonomer, but to the entire composition. As will be seen in the examples below, comonomer compositions may be prepared which comprise a small proportion of monomers which are not specifically hydrophobic, or even clearly hydrophilic, and which are ordinarily added to these mixtures to adjust the glass transition temperature (Tg) or latex stability.

The overprint varnishes according to the invention are preferably compositions comprising 30% top 90% composite latex and from 5% to 20% polyethylene wax emulsions. They provide a highly advantageous compromise between two conflicting properties of the resinous constituents, i.e., the increase in the hardness of the final film, at the expense of a nevertheless acceptable sensitivity to water provided by the hydrophilicity thereof. The overprint varnishes formulated according to the invention are advantageously applied to preprinted papers, rigid cardboard boxes used for packaging, including those for foodstuffs, multi-layer bags, paper plates, packaging for microwave-heatable products, magazine covers, and glossy papers.

In order to further illustrate the present invention and the advantages thereof, the following specific examples are given, it being understood that same are intended only as illustrative and in nowise limitative.

In said examples to follow, the latices were characterized by means of the tests described below.

The molecular weight of the resin was calculated by GPC in a solvent medium containing tetrahydrofuran and 5% acetic acid on "PL-Gel" chromatographic columns.

Particle size was measured using a Coulter N4SD apparatus.

Viscosities were measured at 23° C. using a Brookfield RV viscosimeter.

Estimation of resistance to temperature was a visual test entailing exposure of a section of cardboard coated with a thin film of overprint varnish for 10 seconds on a metal plate heated to 200° C. and observation of the changes occurring.

Glossiness was measured at a 600 angle in accordance with Standard No. ASTM D-523.

Water-resistance was assessed either by a Cobb test or, in general, by placing a drop of water on the varnished surface and by monitoring the change of appearance after 15 seconds and 1 minute.

EXAMPLE 1

Preparation of composite latices

Latex(a) according to the invention (latex having a 30% concentration of SMA):

240 g of a copolymer resin of styrene and maleic anhydride having a molecular weight of 1,600 and an acid number of from 465 to 495, 1,110 g demineralized water, and 136.8 g 28%. ammonia in water were successively introduced into a glass three-necked 3-liter reaction vessel equipped with a mechanical stirrer. All reagents were heated to 60° C. and stirred continuously until the copolymer of low molecular weight had dissolved, which provided a dispersing effect. The solution was heated to 85° C., and then a mixture of 207.2 g styrene, 341.6 g butyl acetate, 5.6 g acrylic acid, and 5.6 g acrylamide, and a mixture of a solution of 10 g $(NH_4)S_2O_8$ in 200 g water was added under a nitrogen atmosphere and while under stirring, the operation being carried out continuously, as indicated above, for two hours using dosing pumps in the copolymer solution previously prepared and at 85° C. The reaction medium was maintained for another two hours at 85° C., then cooled under mild stirring.

A latex having the following characteristics was obtained.

Dry solids content: 45.6%

Brookfield viscosity at 23° C.: 1,000 mPa.s pH: 9

Average particle diameter: 70 nm

Latex(b): Composite latex according to the prior art (latex having a 65% concentration of SMA)

520 g of a copolymer resin of styrene and maleic anhydride having a molecular weight of 1,600 and an acid number of from 465 to 495, 840.4 g demineralized water, and 296.4 g ammonia in a 28% concentration in water were successively introduced into a glass three-necked 3-liter reaction vessel equipped with a mechanical stirrer. All reagents were heated to 60° C. and stirred continuously until the copolymer of low molecular weight had dissolved, which provided a dispersing effect. The solution was heated to 85° C., and then a mixture of 103.6 g styrene, 170.8 g butyl acetate, 2.8 g acrylic acid, and 2.8 g acrylamide, and a mixture of a solution of 5 g $(NH_4)_2S_2O_8$ in 200 g water was added under a nitrogen atmosphere and while under stirring, the operation being carried out continuously, as indicated above, for two hours using dosing pumps in the copolymer solution previously prepared and at 85° C. The reaction medium was maintained for another two hours at 85° C., then cooled under mild stirring.

A latex having the following characteristics was obtained.

Dry solids content: 45.6% pH: 9

Average particle diameter: 66 nm

EXAMPLE 2

Overprint varnish formulations

An overprint varnish composition was formulated containing composite latices and a polyethylene wax emulsion, in accordance with the formula (percentages by weight):

Composite latex: 76

Polyethylene wax emulsion: 8

Heat-resistance agent (ZnO): 3

Leveling agent (glycol ether): 4

28% ammonia: 1.2

Water: 7.7

A varnish was obtained from the composite latex(a) of Example 1, the varnish(b) being from the composite latex(b) of that same example.

EXAMPLE 3

Comparative performances of the overprint varnishes

Each varnish prepared in Example 2 (varnish(a), varnish (b)) was applied to a sheet of cardboard using a polishing film-spreader and dried at 175° C. for 1 minute. Heat-resistance, gloss, and water-resistance were measured or observed by means of the tests described above. The results obtained are reported in the following Table:

TABLE

| Varnish | Heat-resistance | Gloss at 60° C. | Water-resistance |
|---------|-----------------|-----------------|------------------|
| a | Good | 71 | Good |
| b | Good | 69 | Poor |

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. An overprint varnish which comprises a composite latex, said composite latex comprising the copolymerizate of at least one hydrophobic monomer within an aqueous solution of a styrene/maleic anhydride resin, said styrene/maleic anhydride resin having a molecular weight ranging from 500 to 5,000 and an acid number of at most 500, and the amount by weight of said styrene/maleic anhydride resin in said copolymerizate ranging from 5% to 50%.

2. The overprint varnish as defined by claim 1, said at least one hydrophobic monomer comprising styrene or derivative thereof, or a (meth)acrylic ester.

3. The overprint varnish as defined by claim 1, further comprising a polyethylene wax emulsion.

4. The overprint varnish as defined by claim 3, comprising from 30% to 90% of said composite latex and 5% to 20% of said polyethylene wax emulsion.

5. The overprint varnish as defined by claim 1, said styrene/maleic anhydride resin being salified with ammonia or a nitrogenous base.

6. The overprint varnish as defined by claim 1, said styrene/maleic anhydride resin being partially esterified with at least one linear or branched alkanol having from 1 to 18 carbon atoms.

7. The overprint varnish as defined by claim 1, said composite latex comprising the free-radical copolymerizate of said at least one hydrophobic monomer within an aqueous solution of said styrene/maleic anhydride resin.

8. The overprint varnish as defined by claim 1, said copolymerizate having a glass transition temperature of less than 30° C.

9. The overprint varnish as defined by claim 1, having a pH of about 9.

10. The overprint varnish as defined by claim 1, further comprising a heat-resistance agent.

11. An overprint varnish which comprises a composite latex and a polyethylene wax emulsion, said composite latex comprising the copolymerizate of at least one hydrophobic monomer within an aqueous solution of a salified styrene/maleic anhydride resin, said styrene/maleic anhydride resin having a molecular weight ranging from 500 to 5,000 and an acid number of at most 500, the amount by weight of said styrene/maleic anhydride resin in said copolymerizate ranging from 5% to 50% and said copolymerizate having a glass transition temperature of less than 30° C.

12. A substrate coated with a dried film of the overprint varnish as defined by claim 1.

13. A paper, cardboard or packaging substrate coated with a dried film of the overprint varnish as defined by claim 1.

14. A substrate coated with a dried film of the overprint varnish as defined by claim 11.

15. A paper, cardboard or packaging substrate coated with a dried film of the overprint varnish as defined by claim 11.

16. The copolymerizate of at least one hydrophobic monomer within a matrix of a styrene/maleic anhydride resin, said styrene/maleic anhydride resin having a molecular weight ranging from 500 to 5,000 and an acid number of at most 500, and the amount by weight of said styrene/maleic anhydride resin in said copolymerizate ranging from 5% to 50%.

17. The copolymerizate as defined by claim 16, having a glass transition temperature of less than 30° C.

18. The copolymerizate as defined by claim 17, said at least one hydrophobic monomer comprising styrene or derivative thereof, or a (meth)acrylic ester.

19. The copolymerizate as defined by claim 17, said styrene/maleic anhydride resin being salified.

20. The copolymerizate as defined by claim 17, said styrene/maleic anhydride resin being partially esterified with at least one linear or branched alkanol having from 1 to 18 carbon atoms.

21. The overprint varnish of claim 1, wherein said styrene/maleic anhydride resin does not contain grafts of said hydrophobic monomer.

22. The overprint varnish of claim 11, wherein said styrene/maleic anhydride resin does not contain grafts of said hydrophobic monomer.

23. The copolymerizate of claim 16, wherein said styrene/maleic anhydride resin does not contain grafts of said hydrophobic monomer.

\* \* \* \* \*